United States Patent
Park et al.

(10) Patent No.: US 9,505,960 B2
(45) Date of Patent: Nov. 29, 2016

(54) PRESSURE-SENSITIVE ADHESIVE COMPOSITION, POLARIZATION PLATE, AND LIQUID CRYSTAL DISPLAY

(75) Inventors: Min Soo Park, Daejeon (KR); In Cheon Han, Seoul (KR); Ki Seok Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 68 days.

(21) Appl. No.: 13/003,864

(22) PCT Filed: Jul. 16, 2009

(86) PCT No.: PCT/KR2009/003942
§ 371 (c)(1),
(2), (4) Date: Jan. 12, 2011

(87) PCT Pub. No.: WO2010/008231
PCT Pub. Date: Jan. 21, 2010

(65) Prior Publication Data
US 2011/0122343 A1 May 26, 2011

(30) Foreign Application Priority Data
Jul. 16, 2008 (KR) .................... 10-2008-0069124

(51) Int. Cl.
| | | |
|---|---|---|
| *G02F 1/1335* | (2006.01) | |
| *C09J 133/08* | (2006.01) | |
| *C08F 220/18* | (2006.01) | |
| *C09J 175/04* | (2006.01) | |
| *C08F 220/28* | (2006.01) | |

(52) U.S. Cl.
CPC ............ *C09J 133/08* (2013.01); *C08F 220/18* (2013.01); *C09J 175/04* (2013.01); *B32B 2457/202* (2013.01); *C08F 2220/1825* (2013.01); *C08F 2220/281* (2013.01); *C08G 2170/40* (2013.01); *C08G 2270/00* (2013.01); *C09J 2201/606* (2013.01); *G02F 1/133528* (2013.01); *G02F 2202/28* (2013.01); *Y10T 428/105* (2015.01); *Y10T 428/1041* (2015.01); *Y10T 428/1059* (2015.01); *Y10T 428/1077* (2015.01); *Y10T 428/1082* (2015.01)

(58) Field of Classification Search
CPC ........... G02F 1/1335; G02F 1/133528; G02F 2001/1335; G02F 2001/133528; G02F 2202/28; G02B 5/30; G02B 5/3016; C08L 33/04; C08L 33/06; C08L 33/08; C08L 33/10; C08L 33/12; C08J 3/28; C08J 3/24; C08J 3/246; C09J 7/02; C09J 7/0207; C09J 7/021; C09J 7/0217; C09J 7/0239; C09J 7/0246; C09J 133/06; C09J 133/08; C09J 133/10; C09J 133/12; C09J 2201/606; C09J 2203/318; C09J 2203/326; C09J 2433/00; C09J 175/04; C08F 220/18; C08F 2220/1825; C08F 2220/281; C08G 2170/40; C08G 2270/00; B32B 2457/202; Y10T 428/1041; Y10T 428/105; Y10T 428/1059; Y10T 428/1077; Y10T 428/1082
USPC ........ 428/1.1, 1.4, 1.5, 1.51–1.55, 1.6, 1.61, 428/1.62, 355 R, 355 EN, 355 BL, 355 AC, 428/356; 349/96–103, 122–138; 427/208, 427/208.4, 208.6, 208.8; 156/106
See application file for complete search history.

(56) References Cited

U.S. PATENT DOCUMENTS

| | | | | |
|---|---|---|---|---|
| 6,432,475 | B1 * | 8/2002 | Yamamoto et al. ........ | 427/208.4 |
| 1,732,193 | A1 | 7/2004 | Yang et al. | |
| 2004/0127594 | A1 * | 7/2004 | Yang et al. .................. | 522/114 |
| 2005/0148733 | A1 * | 7/2005 | Ohrui et al. .................. | 525/244 |
| 2006/0159915 | A1 * | 7/2006 | Chang et al. .......... | 428/355 AC |
| 2006/0279923 | A1 * | 12/2006 | Kim et al. ..................... | 361/683 |
| 2007/0092733 | A1 | 4/2007 | Yang et al. | |
| 2007/0148485 | A1 * | 6/2007 | Kusama et al. ............. | 428/520 |

FOREIGN PATENT DOCUMENTS

| | | |
|---|---|---|
| CN | 1732193 | 2/2006 |
| CN | 1771310 | 5/2006 |
| CN | 1977015 | 6/2007 |
| CN | 101018839 | 8/2007 |
| JP | 10-310747 A | 11/1998 |
| JP | 2001-115124 A | 4/2001 |
| JP | 2001-262103 A | 9/2001 |
| JP | 2001-335767 A | 12/2001 |
| JP | 2006-096956 A | 4/2006 |
| JP | 2006-512442 A | 4/2006 |

(Continued)

OTHER PUBLICATIONS

Sperling, Interpenetrating Polymer Networks, 2004, Encyclopedia of Polymer Science and Technology, vol. 10, pp. 272-311.*

*Primary Examiner* — Ellen S Wood
*Assistant Examiner* — Eli D Strah
(74) *Attorney, Agent, or Firm* — Dentons US LLP

(57) ABSTRACT

Provided are a pressure-sensitive adhesive (PSA) composition including an interpenetrating polymer network structure in a cured state, and including an acrylic resin and a crosslinking agent component that consists of a bifunctional crosslinking agent, a polarizer and a liquid crystal display. Provided are the PSA composition, the polarizer including a cured product of the PSA composition, and the liquid crystal display, which have excellent workability and optical properties, durability and reliability, at high temperature or humidity condition, and significantly increase productivity of optical members such as a polarizer, since the time-dependent change of the pressure-sensitive adhesive strength is rapidly ended after fabrication.

12 Claims, No Drawings

(56) References Cited

FOREIGN PATENT DOCUMENTS

| | | |
|---|---|---|
| JP | 2007197659 A | 8/2007 |
| JP | 2007212995 A | 8/2007 |
| JP | 2008-503638 A | 2/2008 |
| JP | 2008-517138 A | 5/2008 |
| TW | 200626976 | 8/2006 |
| TW | 200708547 | 3/2007 |
| TW | 200827423 | 7/2008 |
| WO | WO 2006/078119 | 7/2006 |
| WO | WO 2006/132500 | 12/2006 |
| WO | WO 2007/050404 A1 | 5/2007 |

\* cited by examiner

PRESSURE-SENSITIVE ADHESIVE COMPOSITION, POLARIZATION PLATE, AND LIQUID CRYSTAL DISPLAY

This application is a National Stage Entry of International Application No. PCT/KR2009/003942, filed Jul. 16, 2009, and claims the benefit of Korean Application No. 10-2008-0069124, filed on Jul. 16, 2008, which is hereby incorporated by reference for all purposes as if fully set forth herein.

FIELD OF THE INVENTION

The present invention relates to a pressure-sensitive adhesive (PSA) composition, a polarizer, and a liquid crystal display.

DISCUSSION OF RELATED ART

A liquid crystal display is a device that displays images using liquid crystal injected between two thin substrates made of glass. To fabricate a liquid crystal display, basically, a liquid crystal cell having liquid crystal interposed between substrates having transparent electrodes and a polarizer are needed. An adhesive layer or a pressure-sensitive adhesive (PSA) layer is also needed to attach the polarizer to the liquid crystal cell.

A polarizer has a multilayer structure including an iodine compound or a dichroic polarizer material, which is aligned in a certain direction, and triacetyl cellulose-based protective films formed to protect an element or a polarizing film on both surfaces thereof. However, each film constituting such a multilayer polarizer is formed of materials having different molecular structures and compositions, resulting in different physical properties. Accordingly, at high temperature and/or high humidity, the polarizer has a lack of dimensional stability according to differences in contraction or expansion behavior between materials having unidirectional molecular alignment. Thus, in the polarizer fixed by a PSA, if stress is concentrated on the TAC layer at high temperature and/or high humidity, birefringence and light leakage occur.

In order to solve these problems, a PSA has been designed to be very hard. Such a hard PSA prevents contraction and expansion of the polarizer at high temperature and/or high humidity, and thus the stress is minimized and concentrated on the outermost edge of the polarizer, resulting in obtaining relatively excellent optical properties. However, to design the hard PSA, bulk modulus should be increased, and thus adhesive strength is greatly reduced, thereby decreasing durability.

Meanwhile, with only a conventional single crosslinked structure, it is difficult to realize bulk modulus capable of maintaining excellent light leakage characteristics and durability. Therefore, a method of adding a photoinitiator and multi-functional acrylate to the conventional single crosslinked structure and increasing bulk modulus by UV irradiation has been proposed in Japanese Patent Publication Nos. 2007-197659 and 2007-212995.

In the above-mentioned disclosures, due to a fast crosslinking reaction of the multi-functional acrylate using the photoinitiator, right after the UV irradiation, the bulk modulus of the PSA is rapidly increased. Accordingly, it takes long time to terminate the time-dependent change of the adhesive strength, resulting in a great decrease in producibility or workability.

That is, a PSA composition is generally cured using a crosslinking agent very slowly, and thus several days to several weeks are taken to terminate such a curing reaction. A process of storing a PSA composition at a predetermined temperature for a predetermined period of time to terminate curing is referred to as an aging process. In the aging process, the pressure-sensitive adhesive strength of the pressure-sensitive adhesive changes over time. That is, the adhesive strength has the highest level right after being coated, and is gradually reduced as the aging process is continued to reach a predetermined level when the curing of the PSA is terminated. As described above, the adhesive strength of the PSA is changed according to the lapse of time, which is referred to as the time-dependent change of the adhesive strength.

Meanwhile, considering producibility, a PSA for a polarizer should be shipped within 3 to 4 days after production and immediately applicable, and thus the time-dependent change must be rapidly ended. Moreover, considering reworkability, the PSA for a polarizer needs to be repeelable at room temperature or increasing temperature after the PSA has been adhered. Such necessities for fast termination of the time-dependent change, fast stabilization of adhesive strength and reworkability are growing as liquid crystal displays become larger.

However, in the case of the PSA composition disclosed in the above mentioned disclosures, the modulus of the PSA is drastically increased after UV irradiation for curing, and thus the reaction of a resin to a crosslinking agent becomes slower and a very long period of time is required to terminate the time-dependent change. In addition, the PSA composition exhibits a great build up in adhesive strength when the PSA that has been adhered is heated while its curing is not terminated, and thus reworkability is significantly reduced.

SUMMARY OF THE INVENTION

The present invention relates to a pressure-sensitive adhesive (PSA) composition, a polarizer, and a liquid crystal display.

One aspect of the present invention provides a PSA composition, which includes an interpenetrating polymer network structure in a cured state, and comprises an acrylic resin and a crosslinking agent component. Here, the crosslinking agent component consists of a bifunctional crosslinking agent.

Another aspect of the present invention provides a polarizer including: a polarizing film or element; and a pressure-sensitive adhesive layer formed on one or both surfaces of the polarizing film or element and containing a cured product of the PSA composition according to the present invention.

Still another aspect of the present invention provides a liquid crystal display including a liquid crystal panel in which a polarizer is attached to one or both surfaces of a liquid crystal cell.

DETAILED DESCRIPTION OF EXEMPLARY EMBODIMENTS

Hereinafter, exemplary embodiments of the present invention will be described in detail.

The present invention relates to a pressure-sensitive adhesive (PSA) composition that includes an interpenetrating polymer network structure (hereinafter, "IPN structure") in a cured state, and comprises an acrylic resin and a crosslinking agent component. Here, the crosslinking agent component consists of a bifunctional crosslinking agent.

Hereinafter, the PSA composition will be described in further detail.

The PSA composition includes an IPN structure when cured. The term "a cured state of a PSA composition" used herein refers to a state of the composition of the present invention turned into a PSA through irradiation of a radioactive ray and/or heating. In addition, the term "a radioactive ray" refers to an energy ray capable of inducing curing reaction to a polymerizable group or a polymerization initiator included in the PSA composition, the energy ray including an electron ray and a UV ray. Moreover, the term "an IPN structure" refers to a condition, in which a crosslinked structure formed by the reaction of acrylic resin and a crosslinking agent (hereinafter, a "first crosslinked structure") and a separate crosslinked structure (hereinafter, a "second crosslinked structure") exist simultaneously in PSA. Due to the IPN structure of the PSA, the properties required for the PSA for an optical member such as light leakage-preventing properties and durability and reliability may be well balanced.

The PSA composition may satisfy Expression 1:

$$X_1 \leq 700 \text{ g/25 mm} \tag{1}$$

In Expression 1, $X_1$ is a peel strength measured after adhering the PSA formed from the PSA composition to an adherent and storing the result at room temperature for about 168 hours.

In the present invention, $X_1$ may be the peel strength measured after storing the result at room temperature for 96 hours, and preferably the peel strength measured after storing the result at room temperature for about 72 hours.

In the present invention, if $X_1$ exceeds 700 g/25 mm, it may take excessively long time to terminate the time-dependent change of the PSA strength and stabilize adhesive strength after the PSA is formed.

Meanwhile, the term "room temperature" used herein refers to a temperature in a natural state which is not increased or reduced. For example, it may range from about 10° C. to about 30° C., preferably, about 15° C. to about 30° C., more preferably, about 20° C. to about 25° C., and most preferably, approximately 23° C.

The term "peel strength" used herein refers to a peel strength measured after a PSA being adhered to a predetermined adherent, for example, glass, preferably, non-alkali glass. The peel strength may be measured by a method according to an example, which will be described below.

Further, the PSA composition may satisfy Expression 2:

$$X_2 \leq 1500 \text{ g/25 mm} \tag{2}$$

In Expression 2, $X_2$ is a peel strength measured after adhering the PSA formed from the PSA composition to an adherent and storing the result at 50° C. for about 4 hours and then storing the result at room temperature for 168 hours.

In the present invention, $X_2$ may be the peel strength measured after adhering the PSA to the adherent, and storing the result at increased temperature condition (50° C. for about 4 hours) and then storing at room temperature for 96 hours, or preferably, for about 72 hours.

The definitions of the room temperature and peel strength, and the kind of the adherent and the method of measuring the peel strength can all be found with reference to the description related to Expression 1 as described above.

In the present invention, if $X_2$ exceeds 1500 g/25 mm, it may take an excessively long time to terminate the time-dependent change of the PSA strength and to stabilize the adhesive strength after the PSA is formed.

Meanwhile, the acrylic resin and the crosslinking agent component which are included in the PSA composition may react with each other during a curing or aging process, so that the PSA can include the first crosslinked structure as described above.

In one aspect of the present invention, the acrylic resin may have a weight average molecular weight of 300,000 or higher. When the weight average molecular weight of the acrylic resin is less than 300,000, bubbles or peeling phenomena may be generated and thus durability and reliability may be reduced due to reduced cohesion at high temperature and/or high humidity. While the upper limitation of the weight average molecular weight of the acrylic resin is not particularly limited, considering the durability and reliability or coatability of the PSA, the weight average molecular weight may be appropriately controlled within a range of 2,500,000 or less. However, the present invention is not limited thereto.

The composition of the acrylic resin used herein is not particularly limited. For example, the acrylic resin may be a polymer of a monomer mixture including 80 to 99.9 parts by weight of a (meth)acrylic acid ester monomer and 0.1 to 20 parts by weight of a crosslinkable monomer.

In the present invention, the kind of (meth)acrylic acid ester monomer included in the monomer mixture may be, but is not particularly limited to, alkyl (meth)acrylate. For example, if an alkyl group included in the alkyl (meth) acrylate is excessively long, cohesion of the PSA is reduced and thus glass transition temperature (Tg) or adhesive strength may be difficult to control. Thus, alkyl (meth) acrylate having an alkyl group containing 1 to 14 carbon atoms may be used. Examples of the monomers may include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, isononyl (meth)acrylate, rauryl (meth)acrylate, tetradecyl (meth)acrylate, and combinations thereof. The monomer mixture of the present invention may include 80 to 99.9 parts by weight of the (meth)acrylic acid ester monomer. If the content of (meth)acrylic acid ester monomer is less than 80 parts by weight, initial adhesive strength of the PSA may be reduced, and if the content of (meth)acrylic acid ester monomer exceeds 99.9 parts by weight, durability can also be reduced due to the reduction of the cohesion.

The crosslinkable monomer included in the monomer mixture of the present invention is a monomer which can provide a crosslinkable functional group capable of reacting with the following crosslinking agent component to the acrylic resin, and serve to control durability and reliability, adhesive strength and cohesion of the PSA.

Examples of the crosslinkable monomers used herein may be, but are not limited to, monomers containing a hydroxy group, monomers containing a carboxyl group or monomers containing nitrogen. Examples of the monomers containing a hydroxy group may include, but are not limited to, 2-hydroxyethyl (meth)acrylate, 2-hydroxypropyl (meth) acrylate, 4-hydroxybutyl (meth)acrylate, 8-hydroxyoctyl (meth)acrylate, 2-hydroxyethyleneglycol (meth)acrylate and 2-hydroxypropyleneglycol (meth)acrylate, examples of the monomer containing a carboxyl group may include, but are not limited to, (meth)acrylic acid, 2-(meth)acryloyloxy acetic acid, 3-(meth)acryloyloxy propylic acid, 4-(meth) acryloyloxy butyric acid, dimeric acrylic acid, itaconic acid, maleic acid and a maleic acid anhydride, and examples of the monomers containing nitrogen may include, but not limited to, (meth)acrylamide, N-vinyl pyrrolidone and N-vinyl caprolactam. The present invention may use any one or a combination thereof.

The monomer mixture of the present invention may include a crosslinkable monomer in an amount of 0.1 to 20 parts by weight, relative to the weight of the (meth)acrylic ester monomers. If the content of the crosslinkable monomer is less than 0.1 parts by weight, the durability and reliability of the PSA may be reduced, and if the content thereof exceeds 20 parts by weight, due to excessive crosslinking reaction, the adhesive strength and/or peel strength may be reduced.

The monomer mixture of the present invention may further include a compound of Formula 1. The compound of Formula 1 may be added to control a glass transition temperature of the PSA and provide other functions.

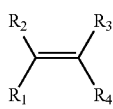

[Formula 1]

In Formula 1, $R_1$ to $R_3$ are independently hydrogen or alkyl, and $R_4$ is cyano, phenyl substituted or unsubstituted with alkyl, acetyloxy or $COR_5$. Here, $R_5$ is glycidyloxy, glycidylalkyloxy or amino substituted or unsubstituted with alkyl or alkoxyalkyl.

In the definitions of $R_1$ to $R_5$, the alkyl or alkoxy is alkyl or alkoxy having 1 to 8 carbon atoms, and preferably, methyl, ethyl, methoxy, ethoxy, propoxy or butoxy.

The monomer of Formula 1 may include, but is not limited to, one or more selected from monomers having nitrogen including (meth)acrylonitrile, (meth)acrylamide, N-methyl (meth)acrylamide and N-butoxy methyl (meth)acrylamide, styrene monomers including styrene and methyl styrene, glycidyl (meth)acrylate, and carbonic acid vinyl esters including vinyl acetate. If the monomer mixture of the present invention includes a compound of Formula 1, the content of the compound may be 20 parts by weight or less. If the content thereof exceeds 20 parts by weight, flexibility and/or peel strength of the PSA may be reduced.

A method of forming acrylic resins including the above-mentioned components is not particularly limited, and may include a common polymerization method such as solution polymerization, light curing, bulk polymerization, suspension polymerization or emulsion polymerization. In the present invention, the acrylic resin may be formed by solution polymerization, which is performed at 50 to 140° C. after monomers have been uniformly mixed together and then an initiator is added thereto. The initiator used herein may be a common initiator such as one or a combination of at least two of azo initiators such as azobisisobutyronitrile and azobiscyclohexane carbonitrile and peroxides such as benzoyl peroxide and acetyl peroxide, but the present invention is not limited thereto.

The PSA composition of the present invention includes a crosslinking agent component which can form a crosslinked structure by reaction with the acrylic resin mentioned above. Particularly, the present invention uses a crosslinking agent component consisting of a bifunctional crosslinking agent. The term "a crosslinking agent component consisting of a bifunctional crosslinking agent" as used herein refers to a crosslinking agent component comprising only a bifunctional crosslinking agent, excluding a multi-functional crosslinking agent, i.e., tri- or more functional crosslinking agent. That is, the term does not mean that the crosslinking agent component is composed of a mixture of tri- or more functional crosslinking agents, or a mixture of a bifunctional crosslinking agent and a tri- or more functional crosslinking agent. However, as far as the crosslinking agent component includes only a bifunctional crosslinking agent, the present invention may use one or a combination of at least two of the crosslinking agents described above.

Examples of the crosslinking agents used herein may include, but are not limited to, general bifunctional crosslinking agents such as isocyanate compounds, epoxy compounds, azyridine compounds, melanin compounds, urea compounds, dialdehyde compounds, methylol polymer compounds, metal alkoxides, metal salts and metal chelate compounds. In the present invention, the crosslinking agent is preferably, but is not limited to, an isocyanate compound or an epoxy compound, and more preferably, an isocyanate compound.

Examples of the isocyanate compounds may include aromatic polyisocyanates such as tolyrene diisocyanate, xylene diisocyanate, diphenylmethane diisocyanate, tetramethylxylene diisocyanate and naphthalene diisocyanate, aliphatic polyisocyanates such as hexamethylene diisocyanate, cycloaliphatic polyisocyanates such as isophorone diisocyanate, and polyisocyanate bifunctional adduct.

Here, the polyisocyanate bifunctional adduct may be formed by reaction of the aromatic, aliphatic or cycloaliphatic polyisocyanate, or another polyisocyanate with diol. Examples of the diols used herein may include, but are not limited to, ethylene glycol, 1,3-propanediol, 1,4-butanediol, 1,6-hexanediol, polyethylene glycol, polypropylene glycol and polytetramethylene glycol. In the present invention, a method of reacting diol with polyisocyanate is not particularly limited, and thus may be a common method in the art. For example, the bifunctional adduct may be formed using slightly excessive polyisocyanate, compared to the stoichiometric amount thereof.

Meanwhile, in the present invention, examples of the epoxy compounds used as the crosslinking agent component may include, but are not limited to, resorcinol diglycidylether, neopentylglycol diglycidylether, 1,6-hexanediol diglycidylether, bisphenol A diglycidylether hydride, polyethyleneglycol diglycidylether, polypropyleneglycol diglycidylether and combinations thereof.

The kinds of the aziridine compounds, melamine compounds, urea compounds, dialdehyde compounds, methylol polymer compounds, metal alkoxides, metal salts and metal chelate compounds are not particularly limited. That is, the present invention selects a bifunctional crosslinking agent from all the kinds of multifunctional crosslinking agents generally known in the PSA manufacture field.

For example, examples of the metal chelate compounds used herein may include, but are not limited to, compounds in which a multivalent metal such as aluminum, iron, zinc, tin, titanium, antimony, magnesium and/or vanadium is coordinated by acetyl acetone or ethyl acetoacetate.

The crosslinking agent component may be included in an amount from 0.01 to 10 parts by weight, and preferably from 0.01 to 5 parts by weight relative to 100 parts by weight of the acrylic resin in the PSA composition of the present invention. If the content of the crosslinking agent is less than 0.01 parts by weight, cohesion of the PSA may be reduced, and if the content thereof exceeds 10 parts by weight, delamination or lifting may occur, resulting in reduction in durability and reliability.

The PSA composition of the present invention may further include a surfactant or a plasticizer along with the above-mentioned components. As described above, when the surfactant or plasticizer is added to combine, time to complete the time-dependent change may be shortened in the manufacture of the PSA, and thus stability of the adhesive strength may be more rapidly and effectively obtained. In the present invention, one or two kinds of the surfactant or plasticizer may be independently or simultaneously used.

The kind of the surfactant used herein is not particularly limited as long as it is served as described above. Thus, examples of the surfactants may include all kinds of siloxane surfactants, and particularly, polyalkyleneoxide-modified polydimethylsiloxane. The polyalkyleneoxide-modified polydimethylsiloxane may be a compound of Formula 2 as shown below:

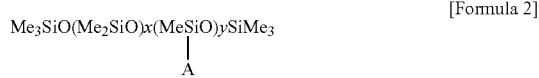

[Formula 2]

In Formula 2, Me is methyl, x is an integer of 0 or more, y is an integer of 1 or more, and A is —$CH_2CH_2CH_2O(EO)_m(PO)_nZ$. Here, EO is ethyleneoxide, PO is propyleneoxide, Z is hydrogen, amine or alkyl, and m+n is 1 or more (but n is not 0).

In the definitions of Formula 2, alkyl may have 1 to 20 carbon atoms, preferably, 1 to 12, more preferably, 1 to 8, and most preferably, 1 to 4 carbon atoms.

Examples of the siloxane compounds may include, but are not limited to, L series products available from Silwet (ex. Silwet L-7200, Silwet L-7210, Silwet L-7220, Silwet L-7230, Silwet L-7280, Silwet L-7550, Silwet L-7607, Silwet L-7608, and Silwet L-8610), and combinations thereof.

Meanwhile, the plasticizer used herein is not particularly limited either. For example, the plasticizer may be an ester compound having at least one ether linkage, which may be a compound of Formula 3 as shown below:

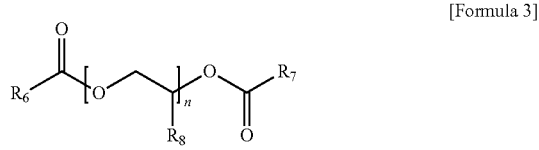

[Formula 3]

In Formula 3, $R_6$ and $R_7$ are independently hydrogen, alkyl, allyl or aryl, $R_8$ is hydrogen or alkyl, and n is an integer ranging from 2 to 20.

In the definitions of the substituents of the compound of Formula 3, alkyl may have 1 to 20 carbon atoms, and preferably 4 to 12 carbon atoms. Allyl may have 6 to 20 carbon atoms, preferably 6 to 12 carbon atoms, and more preferably, phenyl or naphthyl.

Examples of the compounds of Formula 3 used herein may include, but are not limited to, diethyleneglycol di-2-ethylhexonate, tetraethyleneglycol di-2-ethylhexonate, polyethyleneglycol di-2-ethylhexonate, triethyleneglycol diethylbutyrate, polyethyleneglycol diethylbutyrate, polypropyleneglycol diethylhexonate, triethyleneglycol dibenzonate, tetraethyleneglycol dibenzonate, polyethyleneglycol dibenzonate, polypropyleneglycol dibenzonate, poylethyleneglycol-2-ethylhexonate benzonate, and combinations thereof.

In the PSA composition of the present invention, the surfactant or plasticizer may be included in an amount from 0.0001 to 10 parts by weight relative to 100 parts by weight of the acrylic resin described above. The content means an amount of the surfactant or plasticizer, or a total amount of the surfactant and the plasticizer. If the content of the surfactant or plasticizer is less than 0.0001 parts by weight, effects obtained by adding the surfactant or plasticizer may be insignificant, and if the content thereof exceeds 10 parts by weight, physical properties including durability and reliability of the PSA may be degraded.

Components forming a second crosslinked structure in the PSA composition of the present invention are not particularly limited. That is, in the present invention, any components can be used if they can realize the second crosslinking structure in the pressure-sensitive adhesive by reaction with each other while having low reactivity with the acrylic resin and the multifunctional crosslinking agent. For example, the PSA composition of the present invention may include multifunctional acrylate and a polymerization initiator as components of forming the second crosslinked structure.

In this case, the kind of the multifunctional acrylate used herein is not particularly limited. Examples of the multifunctional acrylates may include, but are not limited to, bifunctional acrylates including 1,4-butanediol di(meth)acrylate, 1,6-hexanediol di(meth)acrylate, neopentylglycol di(meth)acrylate, polyethyleneglycol di(meth)acrylate, neophentylglycol adipate di(meth)acrylate, hydroxyl puivalic acid neophentylglycol di(meth)acrylate, dicyclophentanyl di(meth)acrylate, caprolactone-modified dicyclophenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate and 9,9-bis[4-(2-acryloyloxyethoxy)phenyl]fluorine; trifunctional acrylates including trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate and tris(meth)acryloxyethyl isocyanurate; tetrafunctional acrylates including diglycerine tetra(meth)acrylate and pentaerythritol tetra(meth)acrylate; pentafunctional acrylates including propionic acid-modified dipentaerythritol penta(meth)acrylate; and hexafunctional acrylates including dipentalerythritol, hexa(meth)acrylate, caprolactone-modified dipentaerythritol hexa(meth)acrylate and urethane (meth)acrylate (ex. a product obtained by reaction of an isocyanate monomer with trimethylolpropane tri(meth)acrylate).

In the present invention, mixtures of one kind or two or more kinds of the foregoing examples of the multifunctional acrylate may be used, without being limited thereto. In particular, it is desirable to use, but not limited to, trifunctional or higher functional acrylate having a molecular weight of less than 1,000 to achieve excellent endurance.

In one aspect of the present invention, the multifunctional acrylate may have a ring structure in a skeletal structure. This acrylate makes the PSA harder and thus more effectively prevents light leakage. In this case, the ring structure included in the acrylate may be a carbocyclic or heterocyclic structure; or a monocyclic or multicyclic structure. Examples of the multifunctional acrylates having a ring structure may include, but are not limited to, hexafunctional acrylates including monomers having an isocyanurate structure such as tris(meth)acryloxy ethyl isocyanurate and isocyanate-modified urethane (meth)acrylate (ex. a product obtained by reaction of an isocyanate monomer with trimethylolpropane tri(meth)acrylate).

In the PSA composition of the present invention, the multifunctional acrylate may be included in an amount of 5 to 40 parts by weight relative to 100 parts by weight of the acrylic resin. If the content of the multifunctional acrylate is less than 5 parts by weight, durability at high temperature may be reduced, or light leakage may increase. If the content thereof exceeds 40 parts by weight, the durability at high temperature may be reduced.

The kind of the polymerization initiator capable of forming a second crosslinked structure, included in the PSA composition of the present invention, with the above-mentioned multifunctional acrylate, is not particularly limited. For example, the polymerization initiator may be one or more selected from the group consisting of photoinitiators and thermal initiators, and it is preferable to simultaneously use the photoinitiator and the thermal initiator. As the photoinitiator and the thermal initiator are simultaneously included in the PSA composition, all kinds of physical properties of the PSA including low light leakage may be improved. The polymerization initiator may be included in an amount of 0.2 to 20 parts by weight relative to 100 parts by weight of the above-mentioned acrylic resin.

The present invention may use any photoinitiator capable of forming a second crosslinked structure by reaction with the above-mentioned multifunctional acrylate in a curing process of the PSA by UV radiation. The kind of the photoinitiator used herein is not particularly limited, and thus the photoinitiator may be benzoin, benzoin methylether, benzoin ethylether, benzoin isopropylether, benzoin n-butylether, benzoin isobutylether, acetophenone, dimethylamino acetophenone, 2,2-dimethoxy-2-phenylacetypphenone, 2,2-diethoxy-2-phenylacetophenone, 2-hydroxy-2-methyl-1-phenylpropane-1-on, 1-hydroxycyclophenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo [2-hydroxy-2-methyl-1-[4-(1-methylvinyl)phenyl]propanone] or 2,4,6-trimethylbenzoyl-diphenyl-phosphine oxide. One or a combination of at least two of the above-mentioned photoinitiators may be used, but the present invention is not limited thereto.

In the PSA composition of the present invention, the photoinitiator may be included in an amount from 0.2 to 20 parts by weight, preferably 0.2 to 10 parts by weight, and more preferably 0.2 to 5 parts by weight relative to 100 parts by weight of the acrylic resin. Specifically, in the composition of the present invention, the photoinitiator may be included in an amount from 0.2 to 20 parts by weight relative to 100 parts by weight of the multifunctional acrylate described above. If the content of the photoinitiator exceeds the above-mentioned range, it does not easily react to the multifunctional acrylate or the physical properties of the PSA may be deteriorated due to a component remaining after the reaction.

The kind of the thermal initiator used herein is not particularly limited either, and thus may be selected in consideration of the physical properties to be obtained. For example, the present invention may use a thermal initiator having a 10 hour half-life temperature greater than 40° C. and less than 100° C. As the half-life temperature of the thermal initiator is set in such range, a pot-life can be sufficiently ensured, and a dry temperature for decomposition of the thermal initiator may be suitably maintained.

The kind of the thermal initiator used herein is not particularly limited as long as it has the above-mentioned physical properties. For example, the thermal initiator may be a common initiator such as an azo compound, a peroxide compound or a redox compound. Here, examples of the azo compounds may include, but are not limited to, 2,2'-azobis(2-methylbutyronitrile), 2,2'-azobis(isobutyronitrile), 2,2'-azobis(2,4-dimethylbaleronitrile), 2,2'-azobis-2-hydroxymethylpropionitrile, dimethyl-2,2'-azobis(2-methylpropionate), and 2,2'-azobis(4-methoxy-2,4-dimethylbaleronitrile), and examples of the peroxide compounds may include inorganic peroxides including potassium perlactate, ammonium persulfate and hydrogen peroxide; organic peroxides including diacyl peroixde, peroxy dicarbonate, peroxy ester, tetramethylbutylperoxy neodecanoate (ex. Perocta ND, NOF), bis(4-butylcyclohexyl) peroxydicarbonate (ex. Peroyl TCP, NOF), di(2-ethylhexyl) peroxy carbonate, butylperoxy neodecanoate (ex. Perbutyl ND, NOF), dipropyl peroxy dicarbonate (ex. Peroyl NPP, NOF), diisopropyl peroxy decarbonate (ex. Peroyl IPP, NOF), diethoxyethyl peroxy dicarbonate (ex. Peroyl EEP, NOF), diethoxyhexyl peroxy dicarbonate (ex. Peroyl OEP, NOF), hexyl peroxy dicarbonate (ex. Perhexyl ND, NOF), dimethoxybutyl peroxy dicarbonate (ex. Peroyl MBP, NOF), bis(3-methoxy-3-methoxybutyl) peroxy dicarbonate (ex. Peroyl SOP, NOF), dibutyl peroxy dicarbonate, dicetyl peroxy dicarbonate, dimyristyl peroxy dicarbonate, 1,1,3,3-tetramethylbutyl peroxypivalate, hexyl peroxy pivalate (ex. Perhexyl PV, NOF), butyl peroxy pivalate (ex. Perbutyl, NOF), trimethyl hexanoyl peroxide (ex. Peroyl 355, NOF), dimethyl hydroxybutyl peroxyneodecanoate (ex. Luperox 610M75, Atofina), amyl peroxyneodecanoate (ex. Luperox 546M75, Atofina), butyl peroxyneodecanoate (ex. Luperox 10M75, Atofina), t-butylperoxy neoheptanoate, amylperoxy pivalate (ex. Luperox 546M75, Alofina), t-butylperoxy pivalate, t-amyl peroxy-2-ethylhexanoate, rauryl peroxide, dilauroyl peroxide, didecanoyl peroxide, benzoyl peroxide and dibenzoyl peroxide. Examples of the redox-based compounds may include, but are not limited to, mixtures of a peroxide compound with a reducing agent. The present invention may use one or a combination of at least two of the above-mentioned thermal initiators.

In the composition of the present invention, the thermal initiator may be included in an amount from 0.2 to 20 parts by weight, and preferably 0.2 to 5 parts by weight relative to 100 parts by weight of the acrylic resin. If the content of the thermal initiator is less than 0.2 parts by weight, the light leakage of the PSA may be deteriorated, and if the content thereof exceeds 20 parts by weight, durability and reliability of the PSA may be reduced.

The PSA composition of the present invention may further include a silane coupling agent. The coupling agent improves cohesion and adhesion stability between the PSA and the glass substrate, improves heat resistance and humidity resistance, and improves adhesion reliability when the composition remains at high temperature and/or high humidity for a long time. Examples of the coupling agents used herein may include γ-glycidoxypropyl triethoxy silane, γ-glycidoxypropyl trimethoxy silane, γ-glycidoxypropyl methylethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetate propyl trimethoxy silane, γ-acetoacetatepropyl triethoxy silane, β-cyanoacetyl trimethoxy silane, β-cyanoacetyl triethoxy silane, and acetoxyaceto trimethoxy silane, and the present invention may use any one or a combination thereof. It is preferable that a silane coupling agent having an acetoacetate or β-cyanoacetyl group is used, but the present invention is not limited thereto. In the composition of the present invention, the silane coupling agent may be included in an amount from 0.01 to 5 parts by weight, and preferably 0.01 to 1 part by weight relative to 100 parts by weight of the acrylic resin. If the content of the coupling agent is less than 0.01 parts by weight, adhesive strength may insignificantly increase, and if the content thereof exceeds 5 parts by weight, durability and reliability may be reduced.

To control adhesive strength, the PSA composition may further include a tackifier resin in an amount of 1 to 100 parts by weight relative to 100 parts by weight of the acrylic resin. The kind of the tackifier resin is not particularly limited. For example, the tackifier resin may be a (hydrogenated) hydrocarbon resin, a (hydrogenated) rosin resin, a (hydrogenate) rosin ester resin, a (hydrogenated) terpene resin, a (hydrogenated) terpene phenol resin, a polymerized rosin ester resin, or a combination thereof. If the content of the tackifier resin is less than 1 part by weight, an effect obtained by adding the resin may be insignificant, and if the content thereof exceeds 100 parts by weight, compatibility and/or cohesion may be reduced.

The PSA composition of the present invention may further include at least one additive selected from the group consisting of an epoxy resin, a crosslinking agent, a UV stabilizer, an antioxidant, a colorant, a reinforcing agent, a filler, a foaming agent, a surfactant and a plasticizer.

The present invention is also directed to a polarizer including: a polarizing film or element; and a pressure-sensitive adhesive (PSA) layer formed on one or both sides of the polarizing film or element and having a cured PSA composition according to the present invention.

A type of the polarizing film or polarizing element forming the polarizer is not specifically limited. For example, in the present invention, as the polarizing film or polarizing element, a film prepared by adding a polarization component such as iodine or dichroic dyes onto a polyvinyl alcohol resin film and elongating it may be used. Said polyvinyl alcohol resin may comprise polyvinyl alcohol, polyvinyl formal, polyvinyl acetal and hydrolysate of ethylene-vinyl acetate copolymer, and the like. Also, there is no limitation in the thickness of the polarization film and so the polarization film may be made in conventional thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having cyclo or norbornene structure, or ethylene-propylene copolymer, are laminated on one or both sides of the polarizing film. At this time, the thickness of these protective films is also not particularly restricted. It may be formed in a usual thickness.

A method of forming a pressure-sensitive adhesive (PSA) layer on a polarizing film or element in the present invention is not particularly limited. For example, the method may be a method of applying a PSA composition (coating solution) to the polarizing film or element using a common means such as a bar coater and then curing the resultant, or a method of applying a PSA composition to a surface of a peelable member, curing the resultant and transferring the formed PSA layer on a surface of the polarizing film or element. Here, a multifunctional crosslinking agent included in the PSA composition (coating solution) may be controlled to prevent the crosslinking reaction between functional groups during coating to obtain uniform coating. Thus, the crosslinking agent may form a crosslinked structure in curing and aging after the coating so as to improve cohesion, adhesion and cuttability of the PSA.

The method of forming the PSA layer in the present invention may be performed after a volatile component or bubble-inducing component such as a reaction residue is sufficiently removed from the PSA composition (coating solution). As a result, a very low crosslink density or molecular weight, which reduces elasticity, and scatterings due to growing bubbles between a glass plate and the PSA layer at high temperature can be prevented in the PSA.

A method of curing the PSA composition of the present invention during the formation of the polarizer is not particularly limited. For example, the method may be performed by appropriately applying heat to activate the thermal initiator included in the composition, or applying radiation such as UV or an electron ray to induce activation of the photoinitiator. In the present invention, the PSA layer may be formed using both the heat and radiation curing methods.

In the radiation curing methods, UV may be applied by a high pressure mercury lamp, a non-electrode lamp or a xenon lamp. Further, a dose of UV used in the UV curing is not particularly limited as long as it is controlled to perform sufficient curing without damaging to all physical properties. For example, an illuminance may range from 50 to 1000 $mW/cm^2$, and the intensity of radiation may range from 50 to 1000 $mJ/cm^2$.

The PSA layer formed by the above-mentioned process may have a gel content ranging from 80 to 99%, which is expressed by Equation 1:

$$\text{Gel content}(\%) = B/A \times 100 \qquad \text{[Equation 1]}$$

In Equation 1, A is the mass of the PSA, and B is the dry mass of undissolved the PSA after 48-hour immersion in ethyl acetate at room temperature.

If the gel content is less than 80%, the durability and reliability of the PSA may be degraded at high temperature and/or high humidity, and if the gel content exceeds 99%, the stress relaxation of the PSA is reduced.

The polarizer may further include at least one functional layer selected from the group consisting of a protective layer, a reflective layer, an anti-glare layer, a retardation plate, a wide-viewing angle compensation film and a brightness enhancement film.

The present invention is also directed to a liquid crystal display, including a liquid crystal panel in which a polarizer is attached to one or both sides of a liquid crystal cell. Here, the polarizer has been described above.

The kind of the liquid crystal cell constituting the liquid crystal display of the present invention is not particularly limited. Examples of the liquid crystal cells include common liquid crystal cells such as twisted nematic (TN), super twisted nematic (STN), in plane switching (IPS) and vertical alignment (VA) liquid crystal cells. Further, other components included in the liquid crystal display and a method of fabricating the liquid crystal display are not particularly limited, and thus common configuration known in the art may be adopted without limitations.

EXAMPLES

Hereinafter, the present invention will be described in further detail with respect to Examples and Comparative examples, but the scope of the present invention is not limited to the examples described below.

Example 1

Formation of Acrylic Copolymer 99 parts by weight of n-butyl acrylate (n-BA) and 1.0 part by weight of hydroxyethyl acrylate (HEA) were introduced into a 1 L reaction vessel having a device to reflux nitrogen and a cooling device to facilitate temperature control. Subsequently, 120 parts by weight of ethyl acetate (EAc) was injected to the reaction vessel as a solvent and the nitrogen gas was purged for 60 minutes to remove oxygen. Afterwards, the reaction vessel remained at 60° C., and then 0.03 parts by weight of azobisisobutyronitrile (AIBN) was introduced as a reaction initiator for an 8-hour reaction. Thus, an acrylic resin having a weight average molecular weight of 1,700,000 and a molecular weight distribution (Mw/Mn) of 3.4 was obtained.

Formation of PSA Composition

With respect to 100 parts by weight of the acrylic resin, 15 parts by weight of tris(acryloxyethyl)isocyanurate (molecular weight: 423, trifunctional, aronix M-315), 1.5 parts by weight of a mixture of benzophenone with 1-hydroxycyclohexyl phenyl ketone (weight ratio: 1:1) as a photopolymerization initiator, 0.5 parts by weight of hexamethylene diisocyanate (HDI) based difunctional crosslinking agent as a crosslinking agent, and 0.2 parts by weight of a silane coupling agent were mixed together, thereby forming a PSA composition.

Formation of PSA Polarizer

The PSA composition was coated on a PET film (Mitsubishi Corp., MRF-38), which is a releasing-treated peeling sheet and has a thickness of 38 μm, to have a thickness of 25 μm after drying, and then dried in an oven at 110° C. for 3 minutes. Subsequently, the dried coating layer was stored in a constant temperature and humidity room (23° C., 55% RH) for about 24 hours, followed by laminating the PSA layer on a wide view (WV) coating layer of a polarizer coated with a WV liquid crystal layer on one side. Subsequently, UV was applied to the laminated result, and thus the PSA polarizer was completed.

UV radiation apparatus: high pressure mercury lamp
Radiation conditions: Illuminance=600 mW/cm², Intensity of Radiation=150 mJ/cm²

Examples 2 to 6 and Comparative Examples 1 and 2

A PSA polarizer was formed in the same method as described in Example 1, except that composition of PSA compositions was modified as shown in Table 1.

TABLE 1

|  |  | Example |  |  |  |  |  | Comparative example |  |
|---|---|---|---|---|---|---|---|---|---|
|  |  | 1 | 2 | 3 | 4 | 5 | 6 | 1 | 2 |
| Acrylic resin | BA/HEA | 99/1 | 99/1 | 99/1 | 99/1 | 99/1 | 99/1 | 99/1 | 99/1 |
|  | Mw(10000) | 170 | 170 | 170 | 170 | 170 | 170 | 170 | 170 |
|  | Mw/Mn | 3.4 | 3.4 | 3.4 | 3.4 | 3.4 | 3.4 | 3.4 | 3.4 |
|  | parts by weight | 100 | 100 | 100 | 100 | 100 | 100 | 100 | 100 |
| Crosslinking agent (parts by weight) | HDI(1) | 0.5 | 1 | — | — | — | — | — | 0.25 |
|  | HDI(2) | — | — | 0.5 | — | — | — | — | — |
|  | IPDI | — | — | — | 0.5 | 0.5 | 0.5 | — | — |
|  | TDI | — | — | — | — | — | — | 0.5 | 0.25 |
| Plasticizer (parts by weight) | PEGP | — | — | — | — | 0.05 | 0.1 | — | — |
| MFA(parts by weight) |  | 15 | 15 | 15 | 15 | 15 | 15 | 15 | 15 |
| Photoinitiator (parts by weight) |  | 1.5 | 1.5 | 1.5 | 1.5 | 1.5 | 1.5 | 1.5 | 1.5 |
| Silane coupling agent (parts by weight) |  | 0.2 | 0.2 | 0.2 | 0.2 | 0.2 | 0.2 | 0.2 | 0.2 |

BA: butyl acrylate
HEA: hydroxyethyl acrylate
$M_w$: weight average molecular weight
$M_n$: number average molecular weight
HDI(1): hexamethylene diisocyanate Monomers (bifunctional, 50M, Asahi Kasei)
HDI(2): hexamethylene diisocyanate prepolymers (bifunctional, D-101, Asahi Kasei)
IPDI: isophorone diisocyanate bifunctional crosslinking agents
TDI: trimethylolpropane modified tolylene diisocyanate(trifunctional crosslinking agent)
PEGP: poly(ethylene glycol) bis(2-ethylhexanoate)
MFA: mixture of tris(acryloxyethyl)isocyanurate
Photoinitiator: benzophenone and 1-hydroxycyclohexylphenylketone (weight ratio: 1:1)

Performances of the PSAs formed in Examples and Comparative examples were measured.

1. Peel Strength

PSA polarizers formed according to Examples and Comparative examples were cut to a size of 25 mm (width)×100 mm (length) to prepare samples. A peeling sheet was removed from the sample and then attached to a non-alkali glass using a laminator. Subsequently, the laminated sample was compressed for about 20 minutes in an autoclave (50° C., 5 atm), and stored for 4 hours under a constant temperature and humidity condition (23° C., 50% RH). Afterwards, adhesive strength was measured at a peeling rate of 300 mm/min. and a peeling angle of 180° using a analyzer (Texture analyzer, UK stable micro system). The adhesive strengths were measured after attaching at room temperature and storing for 1, 2, 3, 4 and 7 days (RT adhesive strength); and after attaching and storing for 4 hours at 50° C. and then 1, 2, 3, 4 and 7 days at RT (increased temperature adhesive strength).

2. Durability and Reliability

A PSA polarizer formed as described above was cut to a size of 262 mm (width)×465 mm (length) to prepare samples, and then attached to both sides of a glass substrate (having a size of 300 mm (width)×470 mm (length)×0.7 mm (height)) in order to cross optical absorption axes to prepare specimens. The adhesion of the sample to the glass substrate was performed in a clean room to prevent bubbles or contamination at a pressure of about 5 kg/cm². To analyze humidity and heat resistance, the specimen remained at 60° C. and at a relative humidity of 90% for 250 hours (heat resistance condition) and then it was observed whether a bubble or peeling was generated. In addition, the heat resistance was analyzed by observing whether a bubble or peeling was generated after the specimen remained at 80° C. for 250 hours (humidity and heat resistance condition). Here, right before evaluating the state of the specimen, the specimen remained, at room temperature for 24 hours, and the evaluation criteria were as below:

O: no bubbles or peeling
X: bubbles or peeling

3. Uniformity in Light Transmission

PSA polarizers formed according to Examples and Comparative examples were applied to 17" panels to evaluate the uniformity in light transmission. To be specific, the light transmission was measured at four corners of the panel. If a light leakage region is smaller than 2 cm, the light transmission was evaluated as "O," and if a light leakage region is larger than 2 cm, the light transmission was evaluated as "X."

The evaluation results are shown in Table 2.

As seen from the result in Table 2, all PSAs formed according to Examples and Comparative examples exhibited good performances in durability and reliability and uniformity of light transmission. However, in the example using a crosslinking agent component composed of a bifunctional crosslinking agent, the RT adhesive strength characteristic of the PSA after 3 days was rapidly stabilized to 700 g/25 mm, which is the requirement in this industry, or less, and the increased temperature adhesive strength characteristic was also rapidly stabilized to 1500 g/25 mm, which is the requirement in this industry, or less. In the case of the PSA additionally including a plasticizer, the durability and reliability and the uniformity in light transmission were enhanced, but when a trifunctional crosslinking agent (Comparative example 1) or a combination of bifunctional and trifunctional crosslinking agents (Comparative example 2) were used, it took too much time to stabilize the adhesive strength or terminate the time-dependent change. Thus, it can be confirmed that the adhesive strengths at RT and increasing temperature were all greatly over after 7 days of the adhesion.

According to the present invention, a PSA including an IPN structure uses a crosslinking agent component consisting of a bifunctional crosslinking agent to prevent a decrease in diffusion coefficient of a PSA molecule and to effectively perform curing between a resin and a crosslinking agent. The PSA may also use a surfactant or plasticizer, if necessary, to enhance such effect. Thus, the present invention can provide a PSA composition exhibiting workability and optical properties, high durability and reliability, rapidly stabilizing adhesive strength by rapidly stopping changes after the PSA has been formed, and having high reworkability at room temperature or increased temperature, a polarizer including a cured PSA, and a liquid crystal display.

Exemplary embodiments of the present invention have been disclosed herein and, although specific terms are employed, they are used and are to be interpreted in a generic and descriptive sense only and not for purpose of limitation. Accordingly, it will be understood by those of

TABLE 2

| | | Example | | | | | | Comparative Example | |
|---|---|---|---|---|---|---|---|---|---|
| | | 1 | 2 | 3 | 4 | 5 | 6 | 1 | 2 |
| RT Adhesive Strength (g/25 mm) | After 1 day | 755 | 915 | 1395 | 1124 | 495 | 189 | 1820 | 2135 |
| | After 2 days | 607 | 784 | 1049 | 910 | 422 | 199 | 1474 | 2005 |
| | After 3 days | 365 | 610 | 590 | 595 | 493 | 272 | 1427 | 1740 |
| | After 4 days | 327 | 590 | 546 | 582 | 423 | 198 | 1323 | 1720 |
| | After 7 days | 345 | 604 | 638 | 613 | 444 | 276 | 1119 | 1214 |
| RT Adhesive Strength (g/25 mm) | After 1 day | 2313 | 2443 | 2182 | 2434 | 1896 | 967 | 3668 | 3450 |
| | After 2 days | 2283 | 1378 | 1571 | 1137 | 1377 | 758 | 2905 | 3118 |
| | After 3 days | 1069 | 1121 | 1163 | 1087 | 1135 | 940 | 2899 | 2799 |
| | After 4 days | 1056 | 1018 | 1071 | 992 | 1023 | 764 | 2250 | 2710 |
| | After 7 days | 1089 | 1162 | 1127 | 1037 | 1004 | 832 | 1894 | 1944 |
| Durability and Reliability | Heat resistance | O | O | O | O | O | O | O | O |
| | Humidity & Heat Resistance | O | O | O | O | O | O | O | O |
| Light Transmission Uniformity | | O | O | O | O | O | O | O | O |

What is claimed is:

1. A polarizer, comprising:
a polarizing film or element; and
a pressure-sensitive adhesive layer formed on one or both sides of the polarizing film or element, and including a cured product of a pressure-sensitive adhesive composition,
wherein the pressure-sensitive adhesive composition includes an interpenetrating polymer network structure and has re-movability in a cured state,
wherein the composition comprises an acrylic resin; a crosslinking agent component consisting of a bifunctional crosslinking agent; a multi-functional acrylate; and a polymerization initiator, and satisfies Formula 1 and Formula 2:

$$X_1 \leq 638 \text{ g/25 mm} \quad \text{[Formula 1]}$$

where $X_1$ represents peel strength measured after a pressure-sensitive adhesive formed from the pressure-sensitive adhesive composition adheres to a non-alkaline glass adherent and is then stored at room temperature for 168 hours, $$X_2 \leq 1162 \text{ g/25 mm} \quad \text{[Formula 2]}$$

where $X_2$ represents peel strength measured after the pressure-sensitive adhesive formed from the pressure-sensitive adhesive composition adheres to the adherent, and is then stored at 50° C. for about 4 hours, and is then stored at room temperature for 168 hours,
wherein the composition includes the interpenetrating polymer network structure in a cured state which is a condition which comprises a first crosslinked structure formed by the reaction of the acrylic resin and the crosslinking agent, and a second crosslinked structure formed by the multi-functional acrylate and the polymerization initiator, the first crosslinked structure and the second crosslinked structure existing simultaneously in the composition,
wherein the acrylic resin is a polymer of a monomer mixture including 80 to 99.9 parts by weight of a (meth)acrylic acid ester monomer and 0.1 to 20 parts by weight of a crosslinkable monomer, relative to 100 parts by weight of the acrylic resin
wherein the crosslinking agent component is included in an amount of 0.01 to 10 parts by weight, relative to 100 parts by weight of the acrylic resin, and
wherein the multi-functional acrylate is at least one trifunctional acrylate selected from the group consisting of trimethylolpropane tri(meth)acrylate, dipentaerythritol tri(meth)acrylate, propionic acid-modified dipentaerythritol tri(meth)acrylate, pentaerythritol tri(meth) acrylate, propyleneoxide-modified trimethylolpropane tri(meth)acrylate, trifunctional urethane (meth)acrylate and tris(meth)acryloxyethyl isocyanurate.

2. The polarizer according to claim 1, wherein the acrylic resin has a weight average molecular weight of 300,000 or more.

3. The polarizer according to claim 1, further comprising a surfactant or a plasticizer.

4. The polarizer according to claim 3, wherein the surfactant is polyalkyleneoxide-modified polydimethylsiloxane.

5. The polarizer according to claim 3, wherein the surfactant is represented by Formula 4:

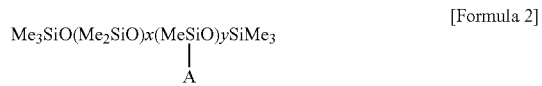

[Formula 2]

where Me is methyl, x is an integer of 0 or more, y is an integer of 1 or more, A is —CH$_2$CH$_2$CH$_2$O(EO)$_m$Z, EO is ethylene oxide, PO is propylene oxide, Z is hydrogen, amine or alkyl, and m+n is 1 or more (but n is not 0).

6. The polarizer according to claim 3, wherein the plasticizer is an ester compound having at least one ether linkage.

7. The polarizer according to claim 3, wherein the plasticizer is represented by Formula 3:

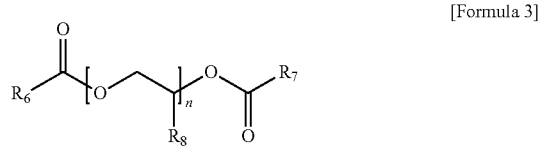

[Formula 3]

where R$_6$ and R$_7$ are independently hydrogen, alkyl, allyl or aryl, R$_8$ is hydrogen or alkyl, and n is an integer of 2 to 20.

8. The polarizer according to claim 3, wherein the surfactant or plasticizer is included in an amount of 0.0001 to 10 parts by weight relative to 100 parts by weight of the acrylic resin.

9. The polarizer according to claim 1, wherein the multi-functional acrylate is included in an amount of 5 to 40 parts by weight relative to 100 parts by weight of the acrylic resin.

10. The polarizer according to claim 1, wherein the polymerization initiator includes at least one selected from the group consisting of a thermal initiator and a photoinitiator.

11. The polarizer according to claim 1, wherein the polymerization initiator is included in an amount of 0.2 to 20 parts by weight relative to 100 parts by weight of the acrylic resin.

12. A liquid crystal display comprising a liquid crystal panel in which the polarizer according to claim 1 is attached to one or both surfaces of a liquid crystal cell.

* * * * *